US008736839B2

(12) United States Patent
Heo et al.

(10) Patent No.: US 8,736,839 B2
(45) Date of Patent: May 27, 2014

(54) OPTICAL MEASURING APPARATUSES INCLUDING POLARIZED BEAM SPLITTERS

(75) Inventors: Young Heo, Hwaseong-si (KR); Chang Hoon Choi, Seongnam-si (KR); Byung Seon Chun, Daejeon (KR); Kwang Soo Kim, Suwon-si (KR); Tae Joong Kim, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 252 days.

(21) Appl. No.: 13/281,656

(22) Filed: Oct. 26, 2011

(65) Prior Publication Data

US 2012/0105859 A1 May 3, 2012

(30) Foreign Application Priority Data

Oct. 27, 2010 (KR) .................. 10-2010-0105450

(51) Int. Cl.
*G01J 4/00* (2006.01)
(52) U.S. Cl.
USPC .......................................... 356/369
(58) Field of Classification Search
USPC .......... 356/364, 369, 456, 495; 359/368, 370, 359/371
See application file for complete search history.

(56) References Cited

U.S. PATENT DOCUMENTS

| 4,634,880 | A |   | 1/1987 | Lindow et al. |         |
|-----------|---|---|--------|---------------|---------|
| 5,526,338 | A | * | 6/1996 | Hasman et al. | 369/94  |
| 7,876,446 | B2| * | 1/2011 | Korner et al. | 356/456 |
| 8,427,644 | B2| * | 4/2013 | Miki          | 356/364 |
| 8,451,457 | B2| * | 5/2013 | Gates et al.  | 356/614 |
| 2004/0109170 | A1 | * | 6/2004 | Schick | 356/614 |
| 2010/0097693 | A1 | * | 4/2010 | Koga | 359/385 |
| 2010/0188742 | A1 |   | 7/2010 | Chen et al. | |

FOREIGN PATENT DOCUMENTS

| FR | 2 930 334 | | 10/2009 |
|----|-----------|---|---------|
| JP | 2006058321 | A | 3/2006 |
| JP | 2008268387 | A | 11/2008 |
| KR | 20100018984 | A | 2/2010 |
| WO | WO 2009/048808 | | 4/2009 |

OTHER PUBLICATIONS

European Search Report dated Jan. 23, 2012, issued in European Application No. 11186642.2.
Ruprecht, Aiko K. et al., "Chromatic confocal detection for high speed micro-topography measurements", Proceedings of SPIE, vol. 5302, No. 1, Jan. 1, 2003, pp. 53-60.

* cited by examiner

*Primary Examiner* — Michael A Lyons
(74) *Attorney, Agent, or Firm* — Harness, Dickey & Pierce, PLC

(57) ABSTRACT

An optical measuring apparatus may include a light source, linear polarizer, polarized beam splitter, quarter wave plate, objective lens, and/or light receiver. The polarized beam splitter may be configured to transmit linearly polarized light from the linear polarizer to any one of a first and second optical path. The quarter wave plate may be configured to circularly polarize light transmitted through the first optical path from the polarized beam splitter and transmit the circularly polarized light to an object to be measured, and the quarter wave plate may be configured to linearly polarize the circularly polarized light reflected from the object to be measured and transmit the linearly polarized reflected light to the second optical path of the polarized beam splitter. The objective lens may be configured to generate light having different wavelengths by generating chromatic aberration in the circularly polarized light from the quarter wave plate.

20 Claims, 4 Drawing Sheets

OPTICAL MEASURING APPARATUSES INCLUDING POLARIZED BEAM SPLITTERS

CROSS-REFERENCE TO RELATED APPLICATION

This application claims priority from Korean Patent Application No. 2010-0105450, filed on Oct. 27, 2010, in the Korean Intellectual Property Office (KIPO), the entire contents of which are incorporated herein by reference.

BACKGROUND

1. Field

Example embodiments relate to precision optical measuring apparatuses that analyze the wavelength of light and measures a three-dimensional (3D) image of an object to be measured.

2. Description of the Related Art

At present, a great development in manufacturing processes of semiconductors, Liquid Crystal Displays (LCDs), etc., causes a remarkable reduction in the line width and height of patterns. To meet this trend, industrial applications may require even more precise and faster inspection and measurement processes. In particular, a variety of methods have been adopted in 3D manufacturing processes to measure the width and height of patterns. A representative example is confocal scanning microscopes using laser. The confocal scanning microscopes have been used for 3D measurement of patterns in a range from several hundred nanometers to several tens of nanometers. With a recent tendency of the width and height of patterns to decrease in relation to measurement processes of semiconductors and LCDs, use of the confocal scanning microscopes is increasing.

The confocal scanning microscopes, which were developed in the 1950's, have greatly advanced. To perform 3D measurement of an object to be measured using a confocal scanning microscope, it may be essential to move an objective lens or the object to be measured in an optical axis direction. Moving the objective lens in the optical axis direction, however, may cause considerable deterioration in the measurement speed of the confocal scanning microscope. Therefore, there may be a solution to increase the measurement speed of the confocal scanning microscope.

SUMMARY

Therefore, at least one example embodiment improves light efficiency of an optical system so as to achieve enhanced measurement precision and speed.

Additional aspects of at least one example embodiment will be set forth in part in the description which follows and, in part, will be obvious from the description, or may be learned by practice of an example embodiment.

According to an example embodiment, an optical measuring apparatus may include a light source, a linear polarizer configured to linearly polarize light emitted from the light source, a polarized beam splitter configured to transmit the linearly polarized light to any one of a first optical path and a second optical path, a quarter wave plate configured to circularly polarize light transmitted through the first optical path from the polarized beam splitter and transmit the circularly polarized light to an object to be measured, and the quarter wave plate configured to linearly polarize the circularly polarized light reflected from the object to be measured and transmit the linearly polarized reflected light to the second optical path of the polarized beam splitter, an objective lens configured to generate light having a plurality of different wavelengths by generating chromatic aberration in the circularly polarized light from the quarter wave plate, and/or a light receiver configured to produce image information of the object to be measured based on light from the second optical path.

The optical measuring apparatus may further include a spectrometer disposed on the second optical path between the polarized beam splitter and the light receiver, the spectrometer being configured to produce spectral lines according to wavelengths of the linearly polarized reflected light.

The optical measuring apparatus may further include a first collimating lens disposed on the first optical path between the polarized beam splitter and the quarter wave plate.

The optical measuring apparatus may further include a cylindrical lens and a first opening device disposed between the linear polarizer and the polarized beam splitter, the cylindrical lens serving to transform the light emitted from the light source into line light. The first opening device may be a linear opening device.

The optical measuring apparatus may further include a second opening device disposed on the second optical path between the polarized beam splitter and the spectrometer so as to have a confocal relationship with the object to be measured. The second opening device may be a linear opening device.

The optical measuring apparatus may further include a second collimating lens disposed on the second optical path between the second opening device and the spectrometer.

The light receiver may include a 3D profile camera configured to analyze wavelengths of received light and produce information about the shape of the object to be measured.

The optical measuring apparatus may further include a first collimating lens disposed on the first optical path between the polarized beam splitter and the quarter wave plate.

The optical measuring apparatus may further include a cylindrical lens and a first opening device disposed between the linear polarizer and the polarized beam splitter, the cylindrical lens serving to transform the light emitted from the light source into line light. The first opening device may be a linear opening device.

The optical measuring apparatus may further include a second opening device disposed on the second optical path between the polarized beam splitter and the spectrometer so as to have a confocal relationship with the object to be measured. The second opening device may be a linear opening device.

The optical measuring apparatus may further include a second collimating lens disposed on the second optical path between the second opening device and the spectrometer.

The light receiver may include a color line camera to directly receive the light, transmitted through the second optical path, from the polarized beam splitter, analyze the color of received light and produce information about the height of the object to be measured based on the color information.

The optical measuring apparatus may further include a first collimating lens disposed on the first optical path between the polarized beam splitter and the quarter wave plate.

The optical measuring apparatus may further include a cylindrical lens and a first opening device disposed between the linear polarizer and the polarized beam splitter, the cylindrical lens serving to transform the light emitted from the light source into line light. The first opening device may be a linear opening device.

The chromatic aberration generated by the objective lens may be chromatic aberration generated in an optical axis direction on the first optical path. The chromatic aberration generated by the objective lens may include chromatic aberration generated in an optical axis direction on the first optical path.

The information about the shape of the object to be measured may be information about the height of the object to be measured.

According to an example embodiment, an optical measuring apparatus may include a light source, a linear polarizer configured to linearly polarize light emitted from the light source, a polarized beam splitter configured to transmit the linearly polarized light to any one of a first optical path and a second optical path, a quarter wave plate configured to circularly polarize light transmitted through the first optical path from the polarized beam splitter and transmit the circularly polarized light to an object to be measured, the quarter wave plate configured to linearly polarize the circularly polarized light reflected from the object to be measured and transmit the linearly polarized reflected light to the second optical path of the polarized beam splitter, an objective lens configured to generate light having a plurality of different wavelengths by generating chromatic aberration in the circularly polarized light from the quarter wave plate, a spectrometer configured to produce spectral lines according to wavelengths of the linearly polarized reflected light from the second optical path of the polarized beam splitter, and/or a light receiver configured to produce information about the shape of the object to be measured from information associated with the spectral lines.

According to an example embodiment, an optical measuring apparatus may include a light source, a linear polarizer configured to linearly polarize light emitted from the light source, a polarized beam splitter configured to transmit the linearly polarized light to any one of a first optical path and a second optical path, a quarter wave plate configured to circularly polarize light transmitted through the first optical path from the polarized beam splitter and transmit the circularly polarized light to an object to be measured, and the quarter wave plate configured to linearly polarize the circularly polarized light reflected from the object to be measured and transmit the linearly polarized reflected light to the second optical path of the polarized beam splitter, an objective lens configured to generate light having a plurality of different wavelengths by generating chromatic aberration in the circularly polarized light from the quarter wave plate, and/or a light receiver including a 3D profile camera, the light receiver configured to analyze wavelengths of light from the second optical path and produce information about the shape of the object to be measured.

According to an example embodiment, an optical measuring apparatus may include a light source, a linear polarizer configured to linearly polarize light emitted from the light source, a polarized beam splitter configured to transmit the incident linearly polarized light to any one of a first optical path and a second optical path, a quarter wave plate configured to circularly polarize light transmitted through the first optical path from the polarized beam splitter and transmit the circularly polarized light to an object to be measured, and the quarter wave plate configured to linearly polarize the circularly polarized light reflected from the object to be measured and transmit the linearly polarized reflected light to the second optical path of the polarized beam splitter, an objective lens configured to generate light having a plurality of different wavelengths by generating chromatic aberration in the circularly polarized light from the quarter wave plate, and/or a light receiver including a color line camera, the light receiver configured to directly receive the light transmitted through the second optical path from the polarized beam splitter, analyze colors of the received light, and produce information about the height of the object to be measured based on the colors of the received light.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
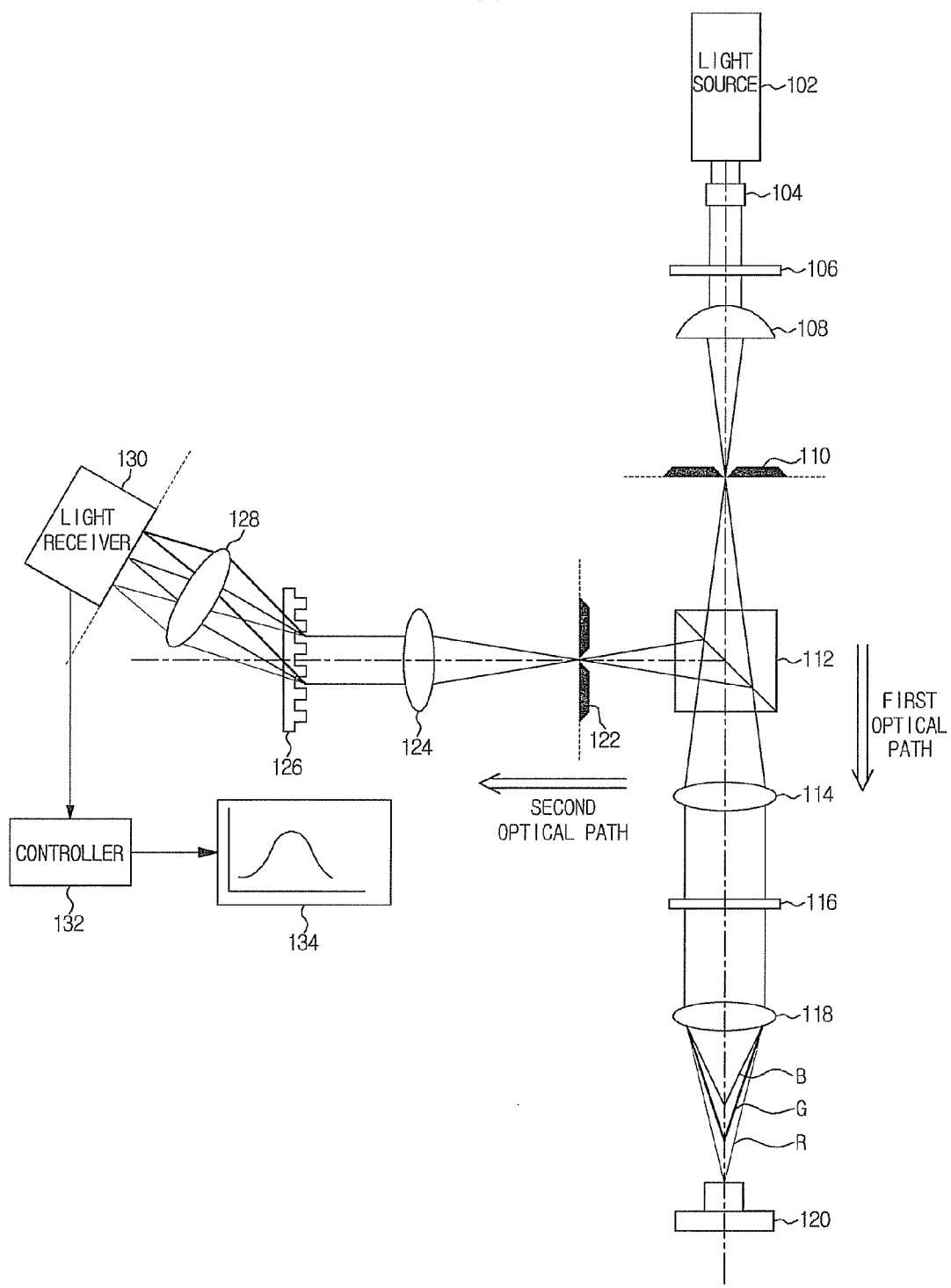
FIG. 1 is a view illustrating an optical system of a chromatic confocal microscope in accordance with an example embodiment.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

At least one example embodiment proposes an improved chromatic confocal microscope to solve low measurement speed of a conventional confocal scanning microscope. The chromatic confocal microscope is configured to generate chromatic aberration using an objective lens such that the shape (especially, the height) of an object to be measured is measured using light having different wavelengths caused by chromatic aberration. The chromatic aberration may include chromatic aberration generated in an optical axis direction. The chromatic aberration may be chromatic aberration generated in an optical axis direction. In this case, although movement of the objective lens, which causes deterioration in the measurement speed of the conventional confocal scanning microscope, does not occur, measuring the height of the object to be measured may require use of a spectrometer which allows a light receiver to analyze the wavelengths of light. In the spectrometer, since an exposure time depends on the quantity of incident light, if the exposure time excessively increases due to an insufficient quantity of light, this may cause a decrease in overall measurement speed. Moreover, due to the fact that measurement is performed on a per point basis, forming a 3D image by measuring the height of the object with respect to the entire area of the object may require a relatively long time. The embodiments are provided to realize a high-speed chromatic confocal microscope in consideration of the above description.

FIG. 1 is a view illustrating an optical system of a chromatic confocal microscope in accordance with an example embodiment.

As illustrated in FIG. 1, a light source 102 is provided to emit light in which light beams having a plurality of wavelengths are mixed. A representative example of light in which light beams having a plurality of wavelengths are mixed is white light. In addition, a light source, which emits light in which light beams having only specific wavelengths selected by a user are mixed, may be used.

A collimator 104 is provided to transform the light emitted from the light source 102 into parallel light.

A linear polarizer 106 is provided to linearly polarize the parallel light having passed through the collimator 104. Polarization by the linear polarizer 106 contributes to achieve improved light efficiency that is a goal of the example embodiment, and a detailed description thereof will follow.

A cylindrical lens 108 is provided to transform the light (having a point shaped cross section), which have passed through the collimator 104 and the linear polarizer 106 after having been emitted from the light source 102, into so-called line light having a line shaped cross section. The cylindrical lens 108 also serves to focus the transformed line light on a first opening device 110. First opening device 110 may be a linear opening device. The line light, which were generated by the cylindrical lens 108 and focused on the first opening device 110, is also focused on an object 120 to be measured (hereinafter, referred to as a measuring object) while maintaining the line shaped cross section thereof. By the line light, higher speed scanning may be possible because of an increased scanning quantity per hour as compared to spot beams.

The first opening device 110 has a slit, through which the line light transformed by the cylindrical lens 108 pass so that only definite light is transmitted to the following step while peripheral blurred light is removed.

A polarized beam splitter 112 may perform total transmission or total reflection of the linearly polarized light. Thus, the polarized beam splitter 112 serves to transmit the linearly polarized light, having passed through the first opening device 110, to the measuring object 120 (along a first optical path) and also, to reflect the linearly polarized light reflected from the measuring object 120 toward a light receiver 130 (along a second optical path). The polarized beam splitter 112 also contributes to achieve, along with the linear polarizer 106, improved light efficiency that is a goal of the example embodiment, and a detailed description thereof will follow.

A first collimating lens 114 is provided to collimate the light having passed through the polarized beam splitter 112 to generate parallel light.

A quarter wave plate 116 is provided to transform incident linearly polarized light into circularly polarized light or vice versa. More particularly, the quarter wave plate 116 may transform the linearly polarized light that is being transmitted from the polarized beam splitter 112 to the measuring object 120 into circularly polarized light, allowing the circularly polarized light to reach the measuring object 120, or in contrast, may transform the circularly polarized light, reflected from the measuring object 120, into linearly polarized light, allowing the linearly polarized light to reach the polarized beam splitter 112. The quarter wave plate 116 also contributes to achieve, along with the linear polarizer 106, improved light efficiency that is a goal of the example embodiment, and a detailed description thereof will follow.

An objective lens 118 may be a single lens or a plurality of lenses. The objective lens 118 serves to focus incident light on the measuring object 120 and generate chromatic aberration of light to be emitted, for example, in an optical axis direction (see reference indications $\lambda 1, \lambda 2, \lambda 3$). The chromatic aberration is intentionally generated in order to measure the shape (especially, the height) of the measuring object 120. To increase a height measurement range and height measurement accuracy of the measuring object 120, the objective lens 118 may be designed to obtain a sufficient degree of chromatic aberration in the optical axis direction of the objective lens 118 to meet the measurement purpose while restricting an unintended remaining chromatic aberration to a significantly low value.

Figure 2:
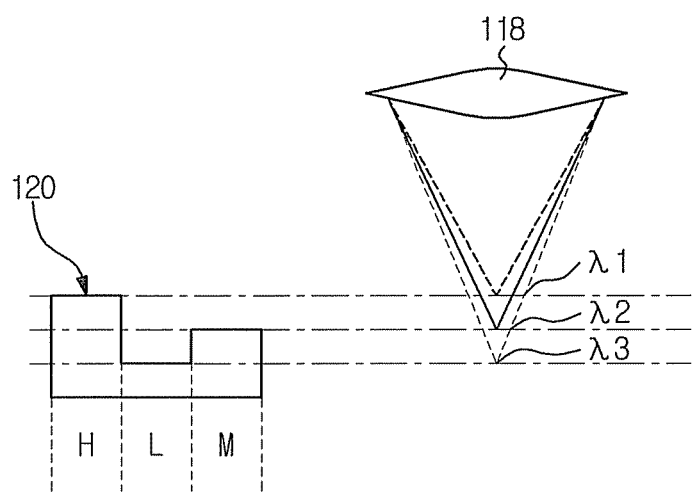
FIG. 2 is a view illustrating reflection of light having different wavelengths depending on the height of an object to be measured.

Here, the chromatic aberration generated by the objective lens 118 will be described in more detail with reference to FIG. 2. FIG. 2 is a view illustrating reflection of light having different wavelengths depending on the height of the measuring object. As illustrated in FIG. 2, the measuring object 120 is divided into three different portions on the basis of the height thereof, and light reflected from the three portions have different wavelengths (colors). Blue light B having a relatively short wavelength is reflected from a high-height portion H of the measuring object 120. Red light R having a long wavelength is reflected from a low-height portion L of the measuring object 120. Green light G having a wavelength, which is greater than that of blue light B and less than that of red light R, is reflected from a medium-height portion M of the measuring object 120. If the objective lens 118 uses a Diffraction Optical Element (DOE) (not shown), in contrast to the above description, red light R having a long wavelength will be reflected from the high-height portion of the measuring object 120 and blue light B having a short wavelength will be reflected from the low-height portion of the measuring object 120. Of course, light having other wavelengths λ, except for red light R, green light G and blue light B may be reflected based on the height of the measuring object 120.

Referring again to FIG. 1, the light reflected from the measuring object 120 again passes through the objective lens 118, the quarter wave plate 116 and the first collimating lens 114 and then, is subject to total reflection by the polarized beam splitter 112, thereby being introduced into a second opening device 122. Second opening device 122 may be a linear opening device. In this case, the second opening device 122 is positioned, based on a relationship of a confocal point with respect to the measuring object 120, such that light focused on and reflected from the measuring object 120 is linearly focused even on the second opening device 122. Since the wavelength of light reflected from the measuring object 120 varies according to the height of the measuring object 120, the light focused on the second opening device 122 has different wavelengths according to different heights of the measuring object 120. In other words, blue light B will be reflected from the high height portion of the measuring object 120 and red light R will be reflected from the low height portion of the measuring object 120. In this way, different colors of linear light will be visually observed according to the height of the measuring object 120.

A second collimating lens 124 transforms the light having passed through the second opening device 122 into parallel light, and a spectrometer 126 is used in spectroscopy to produce spectral lines from the parallel light and measuring their wavelengths. Although the spectrometer 126 illustrated in FIG. 1 is, for example, in the form of a grating, other devices having a spectroscopy function are possible.

A condenser 128 is used to condense the light having passed through the spectrometer 126 on the light receiver 130. In this case, the light receiver 130 is in the form of a charge coupled device (CCD) or a complementary metal oxide semiconductor (CMOS) device having a two-dimensional (2D) light receiving surface. The light receiver 130 produces and transmits image information of the received light to a controller 132. The controller 132 processes and analyzes the image information to display the same via a display 134 if necessary.

The light receiver 130 in the form of a CCD or CMOS causes a difference in the production time of image information according to the quantity of the received light. To generate accurate image information of the light having passed through the spectrometer 126, it may be necessary to provide the light receiver 130 with a sufficient quantity of light. Since the lower the light efficiency of the optical system, the smaller the quantity of light per unit hour received by the light receiver 130, the light receiver 130 may require a longer exposure time in order to receive a required quantity of light for accurate analysis. This means that a time required to produce image information increases as the light efficiency of the optical system decreases. In contrast, if the light efficiency of the optical system illustrated in FIG. 1 increases from 25% to 50%, the quantity of light per unit hour received by the light receiver 130 increases proportionally, whereby the exposure time of the light receiver 130 to receive a required quantity of light for accurate analysis is reduced. The reduced exposure time means that image information may be produced within a reduced time. Therefore, in conclusion, it will be appreciated that improving the light efficiency of the optical system may greatly contribute to high-speed measurement of the measuring object 120. Of course, this also contributes to accurate measurement of an object.

As mentioned above in relation to the linear polarizer 106, the polarized beam splitter 112, and the quarter wave plate 116, the linear polarizer 106, the polarized beam splitter 112, and the quarter wave plate 116 of FIG. 1 greatly contribute to an improvement in the light efficiency. Since the light emitted from the light source 102 is linearly polarized while passing through the linear polarizer 106 and the polarized beam splitter 112 totally transmits or reflects the linearly polarized light, the linearly polarized light from the linear polarizer 106 wholly passes through the polarized beam splitter 112, thereby reaching the quarter wave plate 116. The quarter wave plate 116 transforms the linearly polarized light into circularly polarized light. As the circularly polarized light is reflected from the measuring object 120 and again passes through the quarter wave plate 116, the circularly polarized light is transformed into the linearly polarized light. In this case, a polarization direction forms a right angle with respect to a polarization direction of the light passing through the quarter wave plate 116. If the linear polarizer 106 and the quarter wave plate 116 are not used and only a general beam splitter is used instead of the polarized beam splitter 112, the light emitted from the light source 102 passes through the general beam splitter twice until it reaches the light receiver 130. The quantity of light is reduced by 50% when the light firstly passes through the general beam splitter and then, is also reduced by 50% when the light secondly passes through the general beam splitter. In conclusion, the light receiver 130 receives only a quarter of the light emitted from the light source 102. However, when using the linear polarizer 106, the polarized beam splitter 112, and the quarter wave plate 116 as illustrated in FIG. 1, the light emitted from the light source 102 is reduced by 50% only while passing through the linear polarizer 106 until it reaches the light receiver 130 and the polarized beam splitter 112 and the quarter wave plate 116 do not cause a reduction in the quantity of light (total transmission and total reflection). Consequently, the quantity of light arriving at the light receiver 130 is half the quantity of light emitted from the light source 102. This is greater twice the quantity of light received in the above example in which the linear polarizer 106 and the quarter wave plate 116 are not used and only a general beam splitter is used instead of the polarized beam splitter 112. With an improvement in the light efficiency of the optical system of FIG. 1, high-speed measurement of the measuring object 120 becomes possible.

Figure 3:
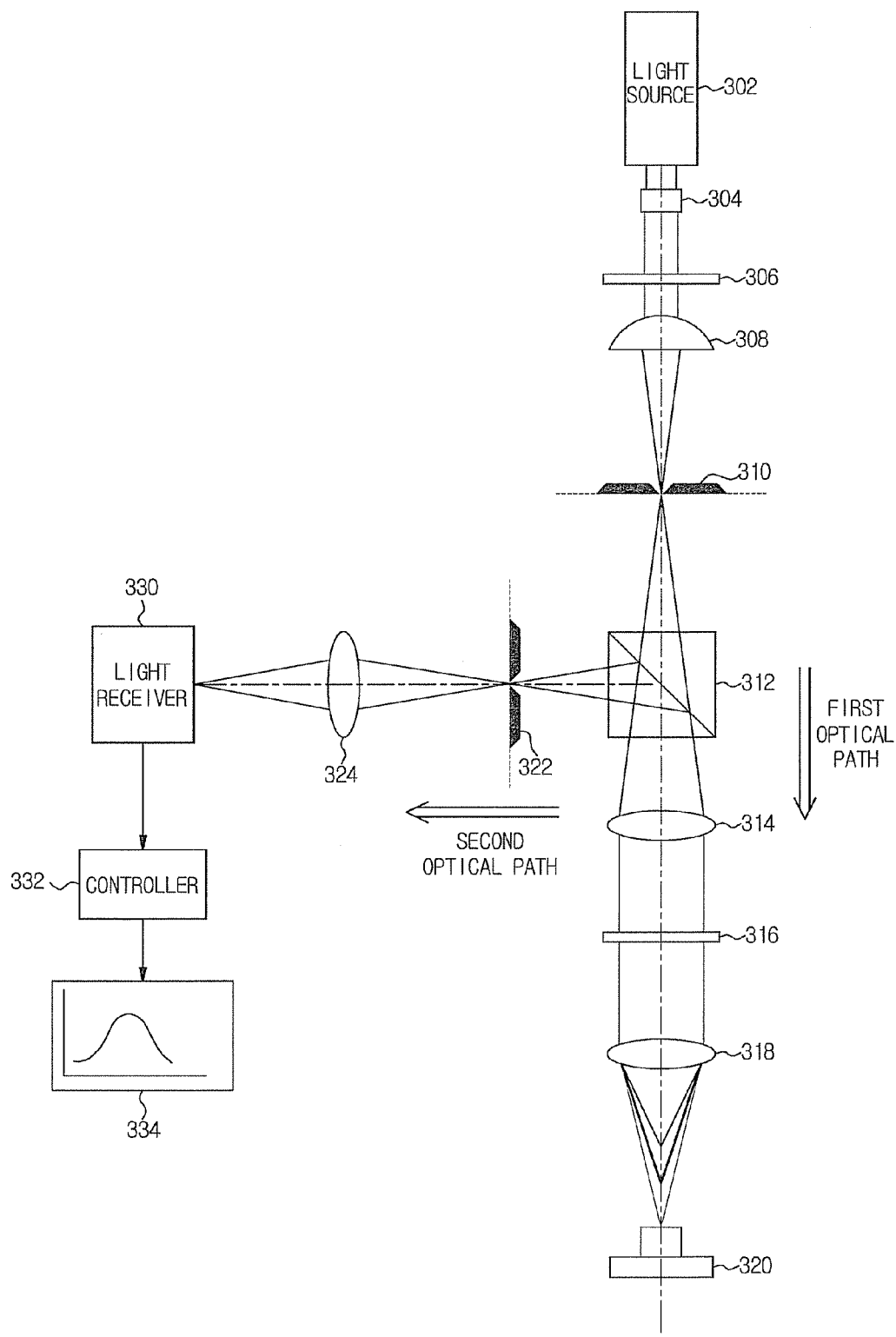
FIG. 3 is a view illustrating an optical system of a chromatic confocal microscope in accordance with a further example embodiment.

FIG. 3 is a view illustrating an optical system of a chromatic confocal microscope in accordance with a further example embodiment.

As illustrated in FIG. 3, a light source 302 is provided to emit light in which light beams having a plurality of wavelengths are mixed. A representative example of light in which light beams having a plurality of wavelengths are mixed is white light. In addition, a light source, which emits light in which light beams having only specific wavelengths selected by a user are mixed, may be used.

A collimator 304 is provided to transform the light emitted from the light source 302 into parallel light.

A linear polarizer 306 is provided to linearly polarize the parallel light having passed through the collimator 304. Polarization by the linear polarizer 306 contributes to achieve improved light efficiency that is a goal of the example embodiment, and a detailed description thereof will follow.

A cylindrical lens 308 is provided to transform the light (having a point shaped cross section), which have passed through the collimator 304 and the linear polarizer 306 after having been emitted from the light source 302, into so-called line light having a line shaped cross section. The cylindrical lens 308 also serves to focus the transformed line light on a first opening device 310. The line light, which were generated by the cylindrical lens 308 and focused on the first opening device 310, is also focused on an object 320 to be measured (hereinafter, referred to as a measuring object) while maintaining the line shaped cross section thereof. By the line light, higher speed scanning may be possible because of an increased scanning quantity per hour as compared to spot beams.

The first opening device 310 has a slit, through which the line light transformed by the cylindrical lens 308 pass so that only definite light is transmitted to the following step while peripheral blurred light is removed.

A polarized beam splitter 312 may perform total transmission or total reflection of the linearly polarized light. Thus, the polarized beam splitter 312 serves to transmit the linearly polarized light, having passed through the first opening device 310, to the measuring object 320 (along a first optical path) and also, to reflect the linearly polarized light reflected from the measuring object 320 toward a light receiver 330 (along a second optical path). The polarized beam splitter 312 also contributes to achieve, along with the linear polarizer 306, improved light efficiency that is a goal of the example embodiment, and a detailed description thereof will follow.

A first collimating lens 314 is provided to collimate the light having passed through the polarized beam splitter 312 to generate parallel light.

A quarter wave plate 316 is provided to transform incident linearly polarized light into circularly polarized light or vice versa. More particularly, the quarter wave plate 316 may transform the linearly polarized light that is being transmitted from the polarized beam splitter 312 to the measuring object 320 into circularly polarized light, allowing the circularly polarized light to reach the measuring object 320, or in contrast, may transform the circularly polarized light, reflected from the measuring object 320, into linearly polarized light, allowing the linearly polarized light to reach the polarized beam splitter 312. The quarter wave plate 316 also contributes to achieve, along with the linear polarizer 306, improved light efficiency that is a goal of the example embodiment, and a detailed description thereof will follow.

An objective lens 318 may be a single lens or a plurality of lenses. The objective lens 318 serves to focus incident light on the measuring object 320 and generate chromatic aberration of light to be emitted in an optical axis direction (see reference indications λ1, λ2, λ3). The chromatic aberration is intentionally generated in order to measure the shape (especially, the height) of the measuring object 320. To increase a height measurement range and height measurement accuracy of the measuring object 320, the objective lens 318 may be designed to obtain a sufficient degree of chromatic aberration in the optical axis direction of the objective lens 318 to meet the measurement purpose while restricting an unintended remaining chromatic aberration to a significantly low value.

Reflection of light having different wavelengths according to the height of the measuring object due to the chromatic aberration generated by the objective lens 318 is already mentioned in relation to FIG. 2.

The light reflected from the measuring object 320 again passes through the objective lens 318, the quarter wave plate 316, and the first collimating lens 314 and then, is subject to total reflection by the polarized beam splitter 312, thereby being introduced into a second opening device 322. Second opening device 322 may be a linear opening device. In this case, the second opening device 322 is positioned, based on a relationship of a confocal point with respect to the measuring object 320, such that light focused on and reflected from the measuring object 320 is linearly focused even on the second opening device 322. Since the wavelength of light reflected from the measuring object 320 varies according to the height of the measuring object 320, the light focused on the second opening device 322 has different wavelengths according to different heights of the measuring object 320. In other words, blue light B will be reflected from the high height portion of the measuring object 320 and red light R will be reflected from the low height portion of the measuring object 320. In this way, different colors of linear light will be visually observed according to the height of the measuring object 320.

A second collimating lens 324 transforms the light having passed through the second opening device 322 into parallel light, and the light receiver 330 receives the parallel light. The light receiver 330 of FIG. 3 may include a color line camera. The color line camera may include an image sensor arranged in a single line. The light receiver 330 analyzes color of the received light and produces and transmits information about the measuring object 320 based on the color information to a controller 332. The controller 332 processes and analyzes the image information to display the same via a display 334 if necessary.

Comparing the embodiment of FIG. 3 with the embodiment of FIG. 1, the embodiment of FIG. 3 does not include the spectrometer 126 as mentioned in relation to FIG. 1. This is because the light receiver 330 may include a color line camera and thus, may not require spectroscopy of incident light according to wavelengths. Eliminating the spectrometer as in the embodiment of FIG. 3 may reduce the number of components and the size of the optical system of the chromatic confocal microscope and moreover, enables high-speed measurement because the exposure time of the light receiver may be freely determined. In addition, as mentioned in relation to FIG. 1, using the linear polarizer 306, the polarized beam splitter 312, and the quarter wave plate 316 may further improve the light efficiency in addition to the improved light efficiency owing to the color line camera, whereby the chromatic confocal microscope illustrated in FIG. 3 achieves further enhancement in high-speed measurement performance and measurement precision.

Figure 4:
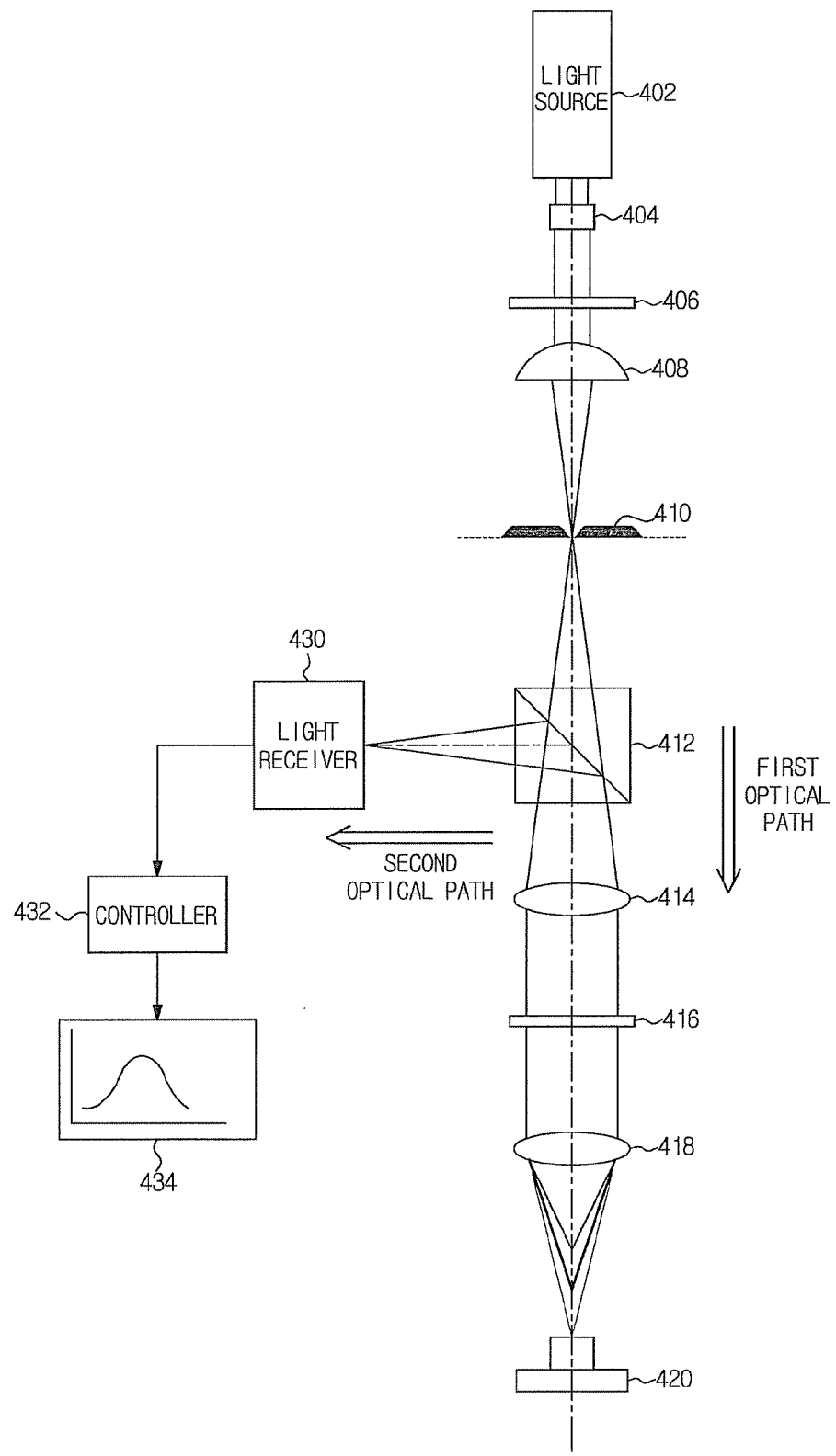
FIG. 4 is a view illustrating an optical system of a chromatic confocal microscope in accordance with another example embodiment.

FIG. 4 is a view illustrating an optical system of a chromatic confocal microscope in accordance with another example embodiment.

As illustrated in FIG. 4, a light source 402 is provided to emit light in which light beams having a plurality of wavelengths are mixed. A representative example of light in which light beams having a plurality of wavelengths are mixed is white light. In addition, a light source, which emits light in which light beams having only specific wavelengths selected by a user are mixed, may be used.

A collimator 404 is provided to transform the light emitted from the light source 402 into parallel light.

A linear polarizer 406 is provided to linearly polarize the parallel light having passed through the collimator 404.

A cylindrical lens 408 is provided to transform the light (having a point shaped cross section), which have passed through the collimator 404 and the linear polarizer 406 after having been emitted from the light source 402, into so-called line light having a line shaped cross section. The cylindrical lens 408 also serves to focus the transformed line light on a first opening device 410. The line light, which were generated by the cylindrical lens 408 and focused on the first opening device 410, is also focused on an object 420 to be measured (hereinafter, referred to as a measuring object) while maintaining the line shaped cross section thereof. By the line light, higher speed scanning may be possible because of an increased scanning quantity per hour as compared to spot beams.

The first opening device 410 has a slit, through which the line light transformed by the cylindrical lens 408 pass so that only definite light is transmitted to the following step while peripheral blurred light is removed.

A polarized beam splitter 412 may perform total transmission or total reflection of the linearly polarized light. Thus, the polarized beam splitter 412 serves to transmit the linearly polarized light, having passed through the first opening device 410, to the measuring object 420 (along a first optical path) and also, to reflect the linearly polarized light reflected from the measuring object 420 toward a light receiver 430 (along a second optical path).

A first collimating lens 414 is provided to collimate the light having passed through the polarized beam splitter 412 to generate parallel light.

A quarter wave plate 416 is provided to transform incident linearly polarized light into circularly polarized light or vice versa. More particularly, the quarter wave plate 416 may transform the linearly polarized light that is being transmitted from the polarized beam splitter 412 to the measuring object 420 into circularly polarized light, allowing the circularly polarized light to reach the measuring object 420, or in contrast, may transform the circularly polarized light, reflected from the measuring object 420, into linearly polarized light, allowing the linearly polarized light to reach the polarized beam splitter 412.

An objective lens 418 may be a single lens or a plurality of lenses. The objective lens 418 serves to focus incident light on the measuring object 420 and generate chromatic aberration of light to be emitted in an optical axis direction (see reference indications $\lambda 1, \lambda 2, \lambda 3$). The chromatic aberration is intentionally generated in order to measure the shape (especially, the height) of the measuring object 420. To increase a height measurement range and height measurement accuracy of the measuring object 420, the objective lens 418 may be designed to obtain a sufficient degree of chromatic aberration in the optical axis direction of the objective lens 418 to meet the measurement purpose while restricting an unintended remaining chromatic aberration to a significantly low value.

Reflection of light having different wavelengths according to the height of the measuring object due to the chromatic aberration generated by the objective lens 418 is already mentioned in relation to FIG. 2.

The light reflected from the measuring object 420 again passes through the objective lens 418, the quarter wave plate 416, and the first collimating lens 414 and then, is subject to total reflection by the polarized beam splitter 412, thereby being received by the light receiver 430. The light receiver 430 of FIG. 4 may include a color line camera. The color line camera may include an image sensor arranged in a single line. The light receiver 430 analyzes color of the received light and produces and transmits information about the measuring object 420 based on the color information to a controller 432. The controller 432 processes and analyzes the image information to display the same via a display 434 if necessary.

Comparing the embodiment of FIG. 4 with the embodiment of FIG. 1, the embodiment of FIG. 4 does not include the second opening device 122, the second collimating lens 124, the spectrometer 126, and the condenser 128 as mentioned in relation to FIG. 1. This is because the light receiver 430 may include a color line camera and thus, may not require spectroscopy of incident light according to wavelengths (i.e., a spectrometer is not necessary) and the color line camera may have, for example, characteristics of a linear opening device (i.e., the second opening device is not necessary). Eliminating a linear opening device, the collimating lens, the spectrometer, and/or the condenser as in the embodiment of FIG. 4 may reduce the number of components and the size of the optical system of the chromatic confocal microscope and moreover, enables high-speed measurement because the exposure time of the light receiver may be freely determined owing to the absence of the spectrometer. In addition, as mentioned in relation to FIG. 1, using the linear polarizer 406, the polarized beam splitter 412 and the quarter wave plate 416 may further improve the light efficiency in addition to the improved light efficiency owing to the color line camera, whereby the chromatic confocal microscope illustrated in FIG. 4 achieves further enhancement in high-speed measurement performance and measurement precision.

As is apparent from the above description, light efficiency of an optical system is improved, resulting in enhanced measurement precision and speed.

While example embodiments have been particularly shown and described, it will be understood by those of ordinary skill in the art that various changes in Rum and details may be made therein without departing from the spirit and scope of the present invention as defined by the following claims.

What is claimed is:

1. An optical measuring apparatus, comprising:
a light source;
a linear polarizer configured to linearly polarize light emitted from the light source;
a polarized beam splitter configured to transmit the linearly polarized light to any one of a first optical path and a second optical path;
a quarter wave plate configured to circularly polarize light transmitted through the first optical path from the polarized beam splitter and transmit the circularly polarized light to an object to be measured, and the quarter wave plate further configured to linearly polarize the circularly polarized light reflected from the object to be measured and transmit the linearly polarized reflected light to the second optical path of the polarized beam splitter;
an objective lens configured to generate light having a plurality of different wavelengths by generating chromatic aberration in the circularly polarized light from the quarter wave plate; and
a light receiver configured to produce image information of the object to be measured based on light from the second optical path.

2. The apparatus according to claim 1, further comprising:
a spectrometer disposed on the second optical path between the polarized beam splitter and the light receiver, the spectrometer being configured to produce spectral lines according to wavelengths of the linearly polarized reflected light.

3. The apparatus according to claim 1, further comprising:
a collimating lens disposed on the first optical path between the polarized beam splitter and the quarter wave plate.

4. The apparatus according to claim 1, further comprising:
a cylindrical lens and an opening device disposed between the linear polarizer and the polarized beam splitter, the cylindrical lens serving to transform the light emitted from the light source into line light.

5. The apparatus according to claim 2, further comprising:
an opening device disposed on the second optical path between the polarized beam splitter and the spectrometer so as to have a confocal relationship with the object to be measured.

6. The apparatus according to claim 5, further comprising:
a collimating lens disposed on the second optical path between the opening device and the spectrometer.

7. The apparatus according to claim 1, wherein the light receiver includes a three-dimensional (3D) profile camera configured to analyze wavelengths of received light and produce information about a shape of the object to be measured.

8. The apparatus according to claim 7, further comprising:
a spectrometer disposed on the second optical path between the polarized beam splitter and the light receiver, the spectrometer being configured to produce spectral lines according to wavelengths of the linearly polarized reflected light.

9. The apparatus according to claim 7, further comprising:
a collimating lens disposed on the first optical path between the polarized beam splitter and the quarter wave plate.

10. The apparatus according to claim 7, further comprising:
a cylindrical lens and an opening device disposed between the linear polarizer and the polarized beam splitter, the cylindrical lens serving to transform the light emitted from the light source into line light.

11. The apparatus according to claim 8, further comprising:
an opening device disposed on the second optical path between the polarized beam splitter and the spectrometer so as to have a confocal relationship with the object to be measured.

12. The apparatus according to claim 8, further comprising:
a first collimating lens disposed on the second optical path between the second a first opening device and the spectrometer.

13. The apparatus according to claim 1, wherein the light receiver includes a color line camera configured to receive the light from the second optical path from the polarized beam splitter, analyze colors of the received light, and produce information about a height of the object to be measured based on the colors of the received light.

14. The apparatus according to claim 12, further comprising:
a second collimating lens disposed on the first optical path between the polarized beam splitter and the quarter wave plate.

15. The apparatus according to claim 12, further comprising:
a cylindrical lens and a second opening device disposed between the linear polarizer and the polarized beam splitter, the cylindrical lens serving to transform the light emitted from the light source into line light.

16. The apparatus according to claim 1, wherein the chromatic aberration generated by the objective lens includes chromatic aberration generated in an optical axis direction on the first optical path.

17. The apparatus according to claim 1, wherein the image information includes information about a height of the object to be measured.

18. An optical measuring apparatus, comprising:
a light source;
a linear polarizer configured to linearly polarize light emitted from the light source;
a polarized beam splitter configured to transmit the linearly polarized light to any one of a first optical path and a second optical path;
a quarter wave plate configured to circularly polarize light transmitted through the first optical path from the polarized beam splitter and transmit the circularly polarized light to an object to be measured, and the quarter wave plate further configured to linearly polarize the circularly polarized light reflected from the object to be measured and transmit the linearly polarized reflected light to the second optical path of the polarized beam splitter;
an objective lens configured to generate light having a plurality of different wavelengths by generating chromatic aberration in the circularly polarized light from the quarter wave plate;
a spectrometer configured to produce spectral lines according to wavelengths of the linearly polarized reflected light from the second optical path of the polarized beam splitter; and
a light receiver configured to produce information about a shape of the object to be measured from information associated with the spectral lines.

19. An optical measuring apparatus, comprising:
a light source;
a linear polarizer configured to linearly polarize light emitted from the light source;
a polarized beam splitter configured to transmit the linearly polarized light to any one of a first optical path and a second optical path;
a quarter wave plate configured to circularly polarize light transmitted through the first optical path from the polarized beam splitter and transmit the circularly polarized light to an object to be measured, and the quarter wave plate further configured to linearly polarize the circularly polarized light reflected from the object to be measured and transmit the linearly polarized reflected light to the second optical path of the polarized beam splitter;
an objective lens configured to generate light having a plurality of different wavelengths by generating chromatic aberration in the circularly polarized light from the quarter wave plate; and
a light receiver including a three-dimensional (3D) profile camera, the light receiver configured to analyze wavelengths of light from the second optical path and produce information about a shape of the object to be measured.

20. An optical measuring apparatus, comprising:
a light source;
a linear polarizer configured to linearly polarize light emitted from the light source;
a polarized beam splitter configured to transmit the linearly polarized light to any one of a first optical path and a second optical path;
a quarter wave plate configured to circularly polarize light transmitted through the first optical path from the polarized beam splitter and transmit the circularly polarized light to an object to be measured, and the quarter wave plate further configured to linearly polarize the circularly polarized light reflected from the object to be measured and transmit the linearly polarized reflected light to the second optical path of the polarized beam splitter;

an objective lens configured to generate light having a plurality of different wavelengths by generating chromatic aberration in the circularly polarized light from the quarter wave plate; and a light receiver including a color line camera, the light receiver configured to receive the light transmitted through the second optical path from the polarized beam splitter, analyze colors of the received light, and produce information about a height of the object to be measured based on the colors of the received light.

* * * * *